(12) United States Patent
Yim

(10) Patent No.: US 7,636,940 B2
(45) Date of Patent: Dec. 22, 2009

(54) PRIVATE KEY PROTECTION FOR SECURE SERVERS

(75) Inventor: Wai Yim, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 794 days.

(21) Appl. No.: 11/103,760

(22) Filed: Apr. 12, 2005

(65) Prior Publication Data

US 2006/0230443 A1 Oct. 12, 2006

(51) Int. Cl.
*G06F 9/00* (2006.01)
*G06F 15/16* (2006.01)
*G06F 17/00* (2006.01)

(52) U.S. Cl. ............................. 726/12; 726/23; 380/281

(58) Field of Classification Search ................... 726/12, 726/23; 380/281
See application file for complete search history.

(56) References Cited

U.S. PATENT DOCUMENTS

| | | | | |
|---|---|---|---|---|
| 5,416,842 | A * | 5/1995 | Aziz .............................. | 380/30 |
| 6,141,759 | A * | 10/2000 | Braddy ........................ | 726/14 |
| 6,292,895 | B1 | 9/2001 | Baltzley | |
| 6,424,718 | B1 * | 7/2002 | Holloway .................... | 380/277 |
| 6,662,228 | B1 * | 12/2003 | Limsico ....................... | 709/225 |
| 6,748,528 | B1 | 6/2004 | Greenfield | |
| 6,754,827 | B1 * | 6/2004 | Cane et al. ................... | 713/193 |
| 6,792,534 | B2 * | 9/2004 | Medvinsky .................. | 713/171 |
| 6,826,690 | B1 * | 11/2004 | Hind et al. ................... | 713/186 |
| 6,959,382 | B1 * | 10/2005 | Kinnis et al. ................ | 713/170 |
| 6,978,025 | B1 * | 12/2005 | Price, III ..................... | 380/282 |
| 7,111,172 | B1 * | 9/2006 | Duane et al. ................. | 713/182 |
| 7,246,232 | B2 * | 7/2007 | Dutertre ....................... | 713/163 |
| 7,418,596 | B1 * | 8/2008 | Carroll et al. ................ | 713/169 |
| 2002/0124064 | A1 * | 9/2002 | Epstein et al. ............... | 709/221 |
| 2002/0126850 | A1 | 9/2002 | Allen et al. | |
| 2003/0051026 | A1 | 3/2003 | Carter et al. | |
| 2003/0093680 | A1 * | 5/2003 | Astley et al. ................. | 713/183 |
| 2003/0147267 | A1 | 8/2003 | Huttunen | |
| 2003/0226013 | A1 * | 12/2003 | Dutertre ....................... | 713/163 |
| 2003/0233538 | A1 * | 12/2003 | Dutertre ....................... | 713/151 |
| 2004/0073786 | A1 * | 4/2004 | O'Neill et al. ............... | 713/155 |
| 2004/0103282 | A1 * | 5/2004 | Meier et al. .................. | 713/171 |
| 2004/0107219 | A1 | 6/2004 | Rosenberger | |
| 2004/0111602 | A1 | 6/2004 | Nishioka | |
| 2004/0161110 | A1 | 8/2004 | Kanai et al. | |
| 2004/0230820 | A1 * | 11/2004 | Hui Hsu et al. .............. | 713/200 |
| 2005/0033963 | A1 * | 2/2005 | Ronchi et al. ................ | 713/170 |
| 2005/0050329 | A1 * | 3/2005 | Wilding et al. .............. | 713/171 |
| 2005/0182973 | A1 * | 8/2005 | Funahashi et al. ........... | 713/202 |
| 2006/0200670 | A1 * | 9/2006 | Kuffel et al. ................. | 713/170 |
| 2006/0230443 | A1 * | 10/2006 | Yim ............................. | 726/12 |
| 2008/0215887 | A1 * | 9/2008 | Hart et al. .................... | 713/172 |
| 2009/0013381 | A1 * | 1/2009 | Torvinen et al. ............. | 726/3 |

* cited by examiner

*Primary Examiner*—David García Cervetti

(57) ABSTRACT

A firewall protects an Ethernet network from a first larger network, e.g., the Internet. A first server on the Ethernet network stores an encrypted private key, decrypts the private key using a passphrase, and communicates with clients on the first network using the private key. A second server on the Ethernet network determines whether an intrusion has occurred from the first network into the first server and provides the passphrase to the first server only when no intrusion has occurred from the first network into the first server. The invention can be realized in apparatuses, methods, and/or instruction sets.

16 Claims, 4 Drawing Sheets

PRIVATE KEY PROTECTION FOR SECURE SERVERS

BACKGROUND

The present invention relates generally to secure communications. More particularly, the present invention relates to private key protection for secure servers.

FIG. 1 shows a conventional secure web services deployment environment 100 where a plurality of web servers 102A-N are connected by an internal network (intranet) 104 such as an Ethernet network to a wide-area network (WAN) 106 such as the Internet. Web servers 102 are generally protected from WAN 106 by a firewall 108.

To protect the communications between secure web services and their clients on WAN 106, many secure web servers 102 employ a public key infrastructure such as that specified by the ITU-T X.509 standard. According to such mechanisms, each web server 102 stores a certificate comprising a public key that is available to the clients of the web server 102, and a private key that is kept from the public. The public and private keys are used together to protect communications between web servers 102 and their clients on WAN 106.

As long as the private key is not released to the general public, the web services are secure. For this reason, the private key file (that is, the file stored on a web server 102 that contains the private key) is generally encrypted to prevent the release of the private key to an intruder accessing the web server 102 in an unauthorized manner from WAN 106. However, whenever the web service is restarted, for example after a power failure affecting the web server 102, a passphrase must be provided to the web server 102 to decrypt the private key file in order to support further secure communications.

According to one conventional technique, the passphrase is provided by a human in response to a prompt from the web server 102. The primary disadvantage of this approach is that the web server is unavailable during the interval required for the human to learn of the outage, travel to the web server 102, and provide the passphrase. Most webs services have availability requirements that render such delays unacceptable.

According to another conventional approach, the passphrase is stored in a file on the web server 102, and is provided to the web service automatically upon restart. The primary disadvantage of this approach is that an attacker could obtain the passphrase, and decrypt and obtain the private key, thereby rendering the web service communications unsecure.

SUMMARY

In general, in one aspect, the invention features an apparatus comprising: a firewall to protect a second network from a first network, wherein the second network is an Ethernet network; a first server on the second network to store an encrypted private key, to decrypt the private key using a passphrase, and to communicate with clients on the first network using the private key; and a second server on the second network to determine whether an intrusion has occurred from the first network into the first server, and to provide the passphrase to the first server only when no intrusion has occurred from the first network into the first server.

In some embodiments, the first server comprises a web server. In some embodiments, the passphrase is hashed according to a hash key. In some embodiments, the second server determines whether the first server is authorized to receive the passphrase before providing the passphrase to the first server. In some embodiments, to determine whether the first server is authorized to receive the passphrase, the second server compares an address of the server to an entry in an authorization table. In some embodiments, the second server authenticates the first server before providing the passphrase to the first server. In some embodiments, to authenticate the first server, the second server sends a challenge to the first server, receives a challenge response from the first server, decrypts the challenge response, and compares the decrypted challenge response to the challenge. In some embodiments, to determine whether an intrusion has occurred from the first network into the first server, the second server determines whether packets traverse unauthorized ports of the first server.

In general, in one aspect, the invention features an apparatus comprising: means for firewalling a second network from a first network; first server means on the second network for storing an encrypted private key, for decrypting the private key using a passphrase, and for communicating with clients on the first network using the private key; and second server means on the second network for determining whether an intrusion has occurred from the first network into the first server, and for providing the passphrase to the first server only when no intrusion has occurred from the first network into the first server.

In some embodiments, the first server means comprises a means for serving web pages. In some embodiments, the passphrase is hashed according to a hash key. In some embodiments, to determine whether an intrusion has occurred from the first network into the first server, the second server determines whether packets traverse unauthorized ports of the first server.

In general, in one aspect, the invention features a method comprising: determining whether an intrusion has occurred from a first network into a server on a second network, wherein the second network is protected from the first network by a firewall, and wherein the second network is an Ethernet network; receiving a request for a passphrase over the second network from the server on the second network; and sending the passphrase to the server over the second network in response to the request for the passphrase from the server only when no intrusion has occurred from the first network into the server on the second network.

In some embodiments, the server on the second network comprises a secure server that stores an encrypted private key; wherein the secure server secures communications with clients on the first network with the private key; and wherein the secure server decrypts the private key with the passphrase. In some embodiments, the server on the second network comprises a web server. In some embodiments, the passphrase is hashed according to a hash key. Some embodiments comprise determining whether the server is authorized to receive the passphrase before sending the passphrase to the server. In some embodiments, determining whether the server is authorized to receive the passphrase comprises: comparing an address of the server to an entry in an authorization table. Some embodiments comprise authenticating the, server before sending the passphrase to the server. In some embodiments, authenticating the server before sending the passphrase to the server comprises: sending a challenge to the server; receiving a challenge response from the server; decrypting the challenge response; and comparing the decrypted challenge response to the challenge. In some embodiments, determining whether an intrusion has occurred from the first network into the server comprises: determining whether packets traverse unauthorized ports of the server. Some embodiments comprise an apparatus to perform the method. Some embodiments comprise a set of instructions or computer program to perform the method.

The details of one or more implementations are set forth in the accompanying drawings and the description below. Other features will be apparent from the description and drawings, and from the claims.

Figure 1:
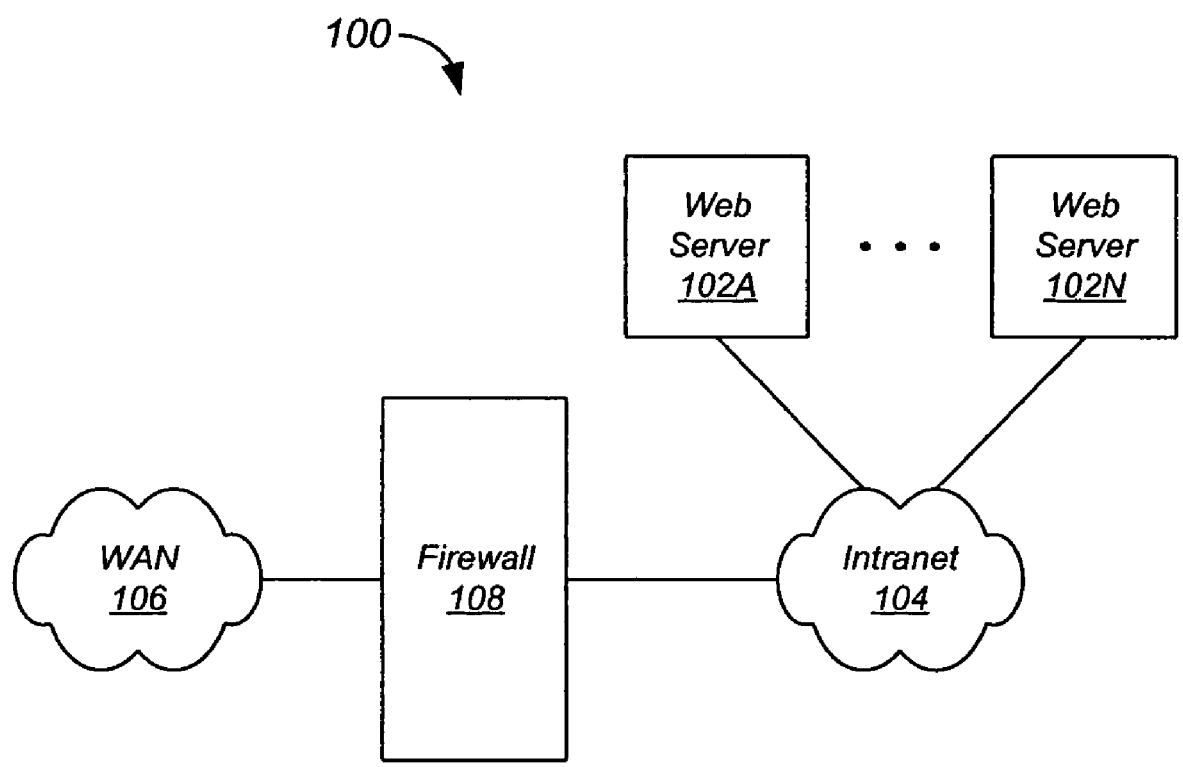
FIG. 1 shows a conventional secure web services deployment environment where a plurality of web servers are connected by an internal network (intranet) such as an Ethernet network to a wide-area network (WAN) such as the Internet.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Embodiments of the present invention provide private key protection for secure servers such as web servers by providing a secure passphrase distribution server that provides the passphrase for the encrypted private key to the web servers and monitors the web servers for intrusion from the wide-area network. When an intrusion into a web server is detected, the secure passphrase distribution server will no longer provide the passphrase to that web server, thereby preventing the intruder from obtaining the private key.

Figure 2:
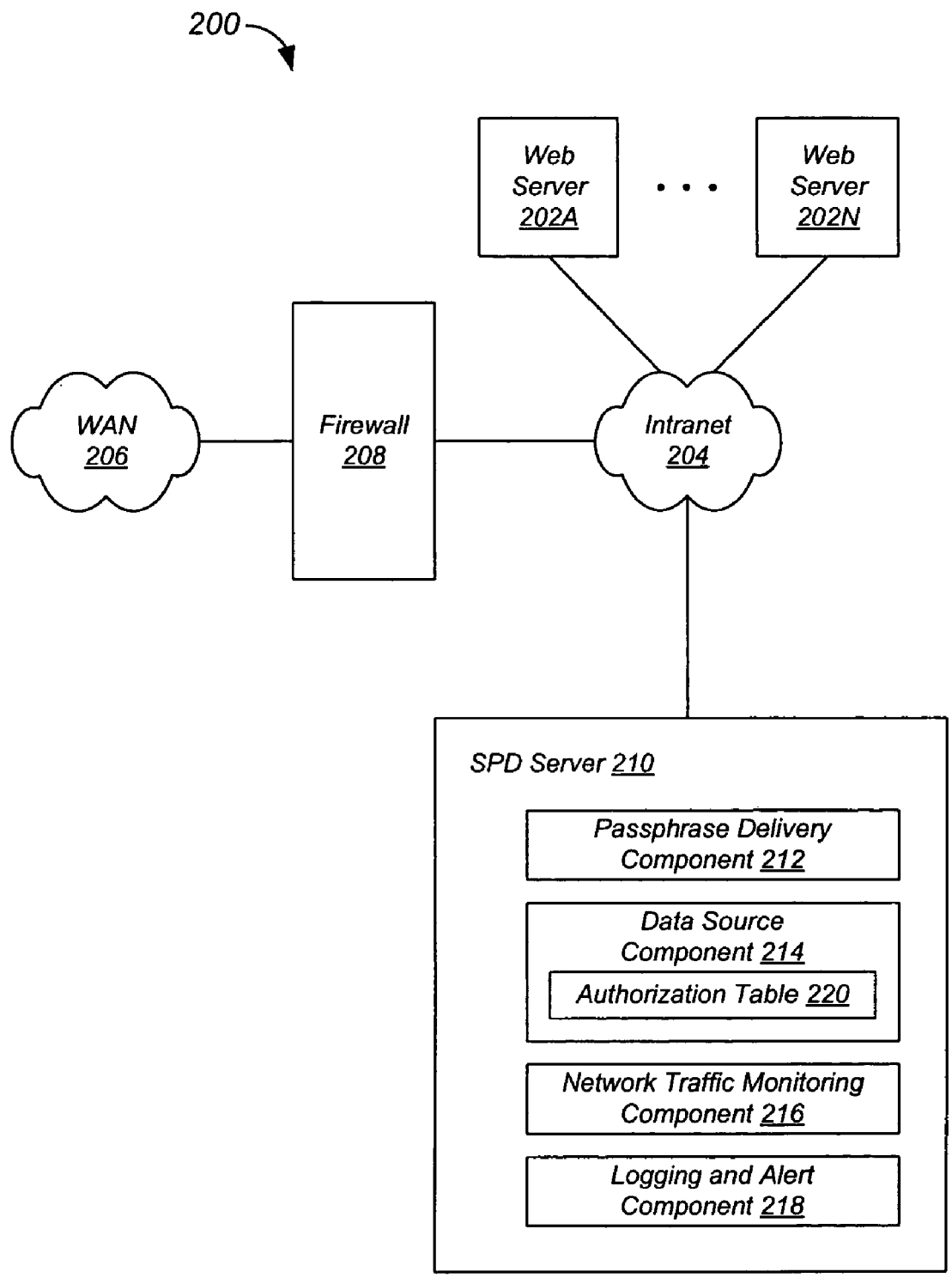
FIG. 2 shows a secure web services deployment environment comprising a secure passphrase distribution server according to a preferred embodiment of the present invention where a plurality of web servers are connected by an internal network (intranet) such as an Ethernet network to a wide-area network (WAN) such as the Internet.

FIG. 2 shows a secure web services deployment environment 200 comprising a secure passphrase distribution server 210 according to a preferred embodiment of the present invention where a plurality of web servers 202A-N are connected by an internal network (intranet) 204 such as an Ethernet network to a wide-area network (WAN) 206 such as the Internet. While embodiments of the present invention are described with reference to web servers 202, other embodiments distribute private keys to other sorts of Transmission Control Protocol (TCP) based services, such as streaming media servers, videoconference servers, and the like, as will be apparent to one skilled in the relevant arts after reading this description. Intranet 204 is preferably an Ethernet network to facilitate monitoring all packet traffic with web servers 202. Web servers 202 are protected from WAN 206 by a conventional firewall 208 with incoming TCP connection forwarding capability or a load balancer system. Secure passphrase distribution server 210 communicates with web servers 202 over intranet 204.

To protect the communications between secure web services and their clients on WAN 206, web servers 202 employ a public key infrastructure such as that specified by the ITU-T X.509 standard. According to such mechanisms, each web server 202 stores a certificate comprising a public key that is available to the clients of the web server 202, and a private key that is kept from the public. The public and private keys are used together to protect communications between web servers 202 and their clients. However, embodiments of the present invention are equally applicable to other sorts of security mechanisms, such as shared private key and the like, as will be apparent to one skilled in the relevant arts after reading this description.

Secure passphrase distribution server 210 comprises four major components. Passphrase Delivery Component 212 is responsible for delivering passphrases to web servers 202. Preferably the passphrases are not sent in plaintext, but rather are sent in hashed form, as described in detail below. Passphrase Delivery Component 212 authorizes and optionally authenticates a web server 202 before delivering the passphrase to that web server 202.

Data Source Component 214 stores a list of web servers 202, a passphrase for each web server 202, and monitor rules. The monitor rules define what activities are permitted on intranet 204, and what activities qualify as intrusions. Preferably the passphrases are not stored in plaintext, but rather are stored in hashed form, as described in detail below. In some embodiments, each web server 202 uses a different passphrase. In other embodiments, some or all of web servers 202 share a passphrase. Data Source Component 214 also stores an authorization table 220 that indicates for each web server 202 whether that web server 202 is allowed to receive a passphrase.

Network Traffic Monitoring Component 216 monitors traffic on intranet 204 according to the monitor rules stored in Data Source Component 214, as described in detail below.

Logging and Alert Component 218 logs the results of the monitoring performed by Network Traffic Monitoring Component 216, and generates alerts for the system administrator when intrusions are detected, as described in detail below.

Preferably Passphrase Delivery Component 212, Data Source Component 214, Network Traffic Monitoring Component 216, and Logging and Alert Component 218 are implemented on a single server such as secure passphrase distribution server 210. However, these components can be implemented on two or more servers in other embodiments.

Figure 3:
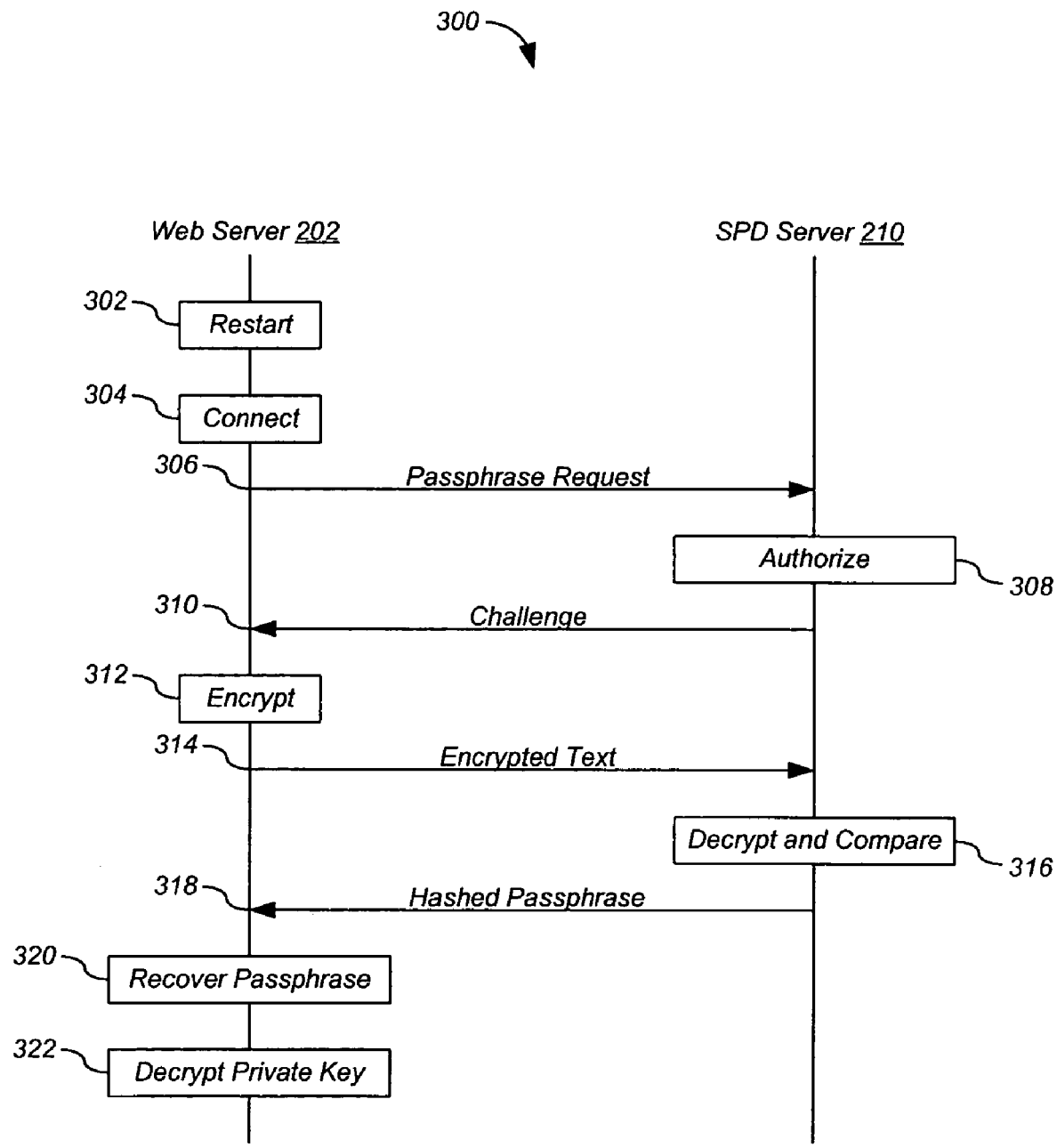
FIG. 3 shows a process for secure passphrase distribution in the secure web services deployment environment of FIG. 2 according to a preferred embodiment of the present invention.

FIG. 3 shows a process 300 for secure passphrase distribution in secure web services deployment environment 200 according to a preferred embodiment of the present invention. A web service on one of web servers 202 restarts (step 302), for example after a power failure causes the web server 202 to reboot. Web server 202 initiates a connection with secure passphrase distribution server 210 (step 304). Preferably the connection is a Secure Sockets Layer (SSL) connection. Web server 202 optionally sends a message to secure passphrase distribution server 210 over the SSL connection requesting the passphrase (step 306).

Secure passphrase distribution server 210 authorizes and optionally authenticates web server 202, for example according to the following process. Secure passphrase distribution server 210 uses Data Source Component 214 to verify that the web server 202 is allowed to receive the passphrase (step 308), for example by looking up web server 202 using the remote peer Internet Protocol (IP) address of the SSL connection. As described in detail below, on detecting an intrusion into a web server 202, Network Traffic Monitoring Component 216 modifies the entry for that web server 202 in Data Source Component 214 to indicate that web server 202 is no longer allowed to receive a passphrase. If the web server 202 is not allowed to receive a passphrase, secure passphrase distribution server 210 drops the SSL connection.

After determining that the web server 202 is allowed to receive a passphrase, secure passphrase distribution server 210 sends a challenge message to the web server 202 (step 310). Preferably the challenge message comprises 512 bytes of random text.

The web server 202 receives the challenge message and encrypts the 512 bytes of random text (step 312) using a key that is built into the code of the web service. Web server 202 sends the encrypted text to secure passphrase distribution server 210 (step 314), which decrypts the encrypted text using the same key and compares the decrypted text to the original random text (step 316).

If the decrypted text does not match the original random text, secure passphrase distribution server 210 drops the SSL connection. But if the decrypted text matches the original random text, secure passphrase distribution server 210 sends the hashed passphrase to web server 202 (step 318), which reverses the hash using a predefined key with which the passphrase was originally hashed (step 320), thereby recovering the passphrase. The web server 202 then uses the passphrase to decrypt the private key (step 322).

Figure 4:
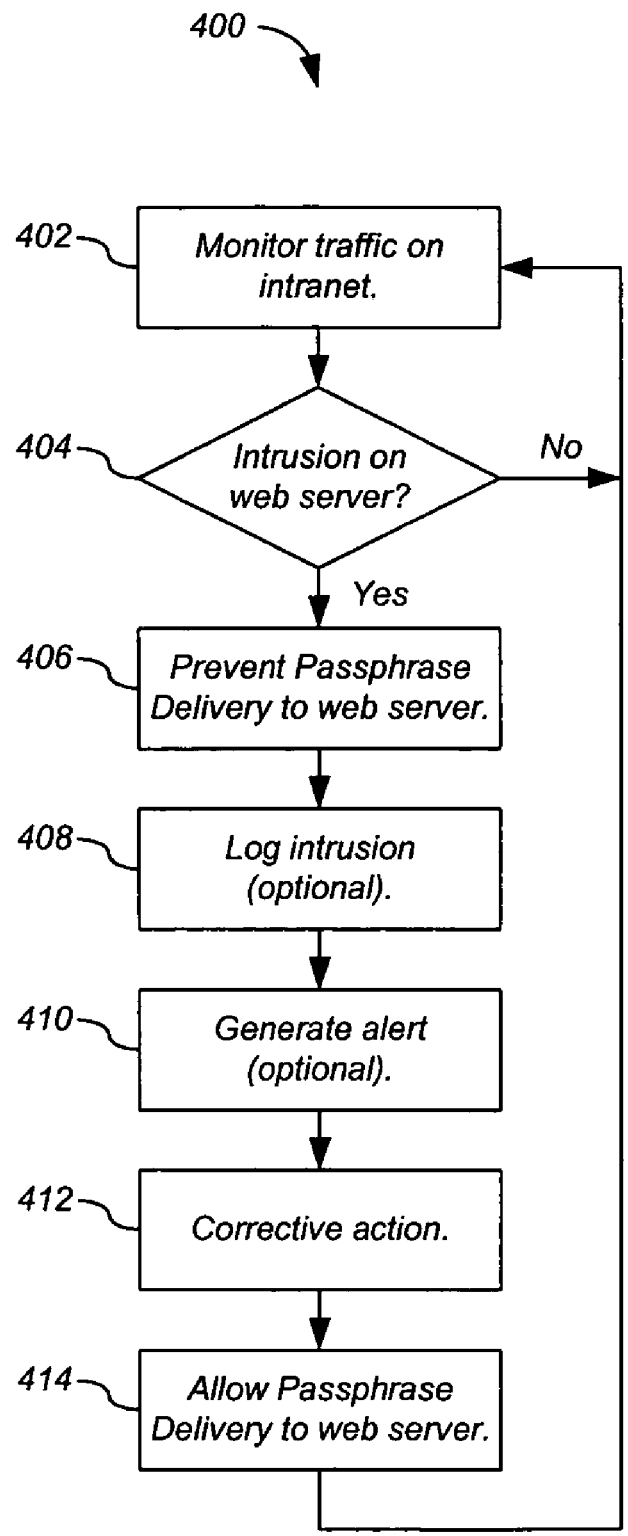
FIG. 4 shows a process for network monitoring and passphrase distribution control in the secure web services deployment environment of FIG. 2 according to a preferred embodiment of the present invention.

FIG. 4 shows a process 400 for network monitoring and passphrase distribution control in secure web services deployment environment 200 according to a preferred embodiment of the present invention. Network Traffic Monitoring Component 216 of secure passphrase distribution server 210 monitors traffic on intranet 204 according to the monitor rules stored in Data Source Component 214 (step 402). For example, web servers 202 should generally only permit connections with WAN 206 on port 80 (for Hypertext Transfer Protocol (HTTP)) and port 443 (for secure HTTP (HTTPS)). Connections with WAN 206 on other ports, whether initiated from WAN 206 or from a web server 202 on intranet 204, are likely the result of an intrusion from WAN 206. Therefore, according to preferred embodiments of the present invention, one monitor rule indicates an intrusion when a connection is detected on any port other than ports 80 and 443. However, embodiments of the present invention are independent of the type of monitor rules used and the manner of monitoring traffic on intranet 204.

According to preferred embodiments of the present invention, secure passphrase distribution server 210 provides a passphrase to a web server 202 only when no intrusion has been detected for that web server 202. Therefore, on detecting an intrusion for a web server 202 (step 404), Network Traffic Monitoring Component 216 of secure passphrase distribution server 210 prevents Passphrase Delivery Component 212 from delivering a passphrase to that web server 202 (step 406). Preferably this is accomplished by modifying the authorization table 220 of Data Source Component 214 to indicate that web server 202 is no longer allowed to receive a passphrase.

Logging and Alert Component 218 optionally logs the intrusion (step 408) and generates an alert for the system administrator (step 410). Preferably the alert takes the form of an email message sent to the system administrator, although of course other techniques can be used. Once corrective action has been taken (step 412), the system administration can once again allow web server 202 to receive a passphrase (step 414), preferably by modifying the entry for that web server 202 in authorization table 220 of Data Source Component 214. Process 400 then resumes at step 402.

The invention can be implemented in digital electronic circuitry, or in computer hardware, firmware, software, or in combinations of them. An apparatus of the invention can be implemented by a program or set of instructions (e.g., a computer program product) tangibly embodied in a machine-readable medium or waveform for execution by an appropriate machine or device, e.g., a programmable processor or the like. Similarly, method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory. and/or a random access memory. Generally, a computer will include one or more mass storage devices for storing data files; such devices include magnetic disks, such as internal hard disks and removable disks; magneto-optical disks; and optical disks. Storage devices suitable for tangibly embodying program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). To this end, the set of instructions or computer program may also be embodied directly in hardware. The set of instructions may also be embodied in a waveform, such as a carrier wave.

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a first server on a first network, wherein the first network is protected from a second network by a firewall, and wherein the first server is adapted to store an encrypted private key, to decrypt the private key using a passphrase, and to communicate with clients on the second network using the private key wherein the first server comprises a memory and a processor; and
a second server on the first network to monitor the first server to determine whether an intrusion has occurred from the second network into the first server, to store the passphrase, and to provide the passphrase to the first server only when no intrusion has occurred from the second network into the first server, or in the event such an intrusion has occurred, only after corrective action has been taken with respect to the first server;
wherein the second server authenticates the first server before providing the passphrase to the first server; and
wherein, to authenticate the first server, the second server sends a challenge to the first server, receives a challenge response from the first server, decrypts the challenge response, and compares the decrypted challenge response to the challenge.

2. The apparatus of claim 1, wherein the passphrase is hashed according to a hash key.

3. The apparatus of claim 1, wherein the second server determines whether the first server is authorized to receive the passphrase before providing the passphrase to the first server.

4. The apparatus of claim 3, wherein, to determine whether the first server is authorized to receive the passphrase, the second server compares an address of the server to an entry in an authorization table.

5. The apparatus of claim 1:
wherein, to determine whether an intrusion has occurred from the second network into the first server, the second server determines whether packets traverse unauthorized ports of the first server.

6. An apparatus comprising:
first server means on a first network, wherein the first network is protected from a second network by a firewall, for storing an encrypted private key, for decrypting the private key using a passphrase, and for communicating with clients on the second network using the private key, wherein the first sever means comprises means for storing data and means for processing the data; and
second server means on the first network for monitoring the first server means for determining whether an intrusion has occurred from the second network into the first server means, for storing the passphrase, and for providing the passphrase to the first server means only when no intrusion has occurred from the second network into the first server means, or in the event such an intrusion has occurred, only after corrective action has been taken with respect to the first server means;
wherein the second server means authenticates the first sever means before providing the passphrase to the first server means; and
wherein, to authenticate the first server means, the second server means sends a challenge to the first sever means, receive a challenge response from the first server means, decrypts the challenge response, and compares the decrypted challenge response to the challenge.

7. The apparatus of claim 6, wherein the passphrase is hashed according to a hash key.

8. The apparatus of claim 6:
wherein, to determine whether an intrusion has occurred from the second network into the first server means, the second server means determines whether packets traverse unauthorized ports of the first sever.

9. A method comprising:
monitoring a first server on a first network to determine whether an intrusion has occurred from a second network into the first server, wherein the first network is protected from the second network by a firewall, and wherein the first network is an Ethernet network and the monitoring is performed by a second server on the first network;
receiving a request for a passphrase over the first network from the first server, the passphrase being stored by the second server;
sending the passphrase from the second server to the first server over the first network in response to the request for the passphrase from the first server only when no intrusion has occurred from the second network into the first server; and
authenticating the first server by the second server before sending the passphrase to the first server, wherein authenticating comprises
sending a challenge to the first server;
receiving a challenge response from the first server;
decrypting the challenge response; and
comparing the decrypted challenge response to the challenge.

10. The method of claim 9:
wherein the first server on the first network comprises a secure server that stores an encrypted private key;
wherein the secure server secures communications with clients on the second network with the private key; and
wherein the secure server decrypts the private key with the passphrase.

11. The method of claim 9, wherein the passphrase is hashed according to a hash key.

12. The method of claim 9, further comprising:
determining whether the first server is authorized to receive the passphrase before sending the passphrase to the server.

13. The method of claim 12, wherein determining whether the first server is authorized to receive the passphrase comprises:
comparing an address of the first sever to an entry in an authorization table.

14. The method of claim 9, wherein determining whether an intrusion has occurred from the second network into the first server comprises:
determining whether packets traverse unauthorized ports of the first server.

15. An apparatus comprising a memory and a processor, wherein the apparatus is adapted to perform the method of claim 9.

16. A medium containing a set of instructions adapted to cause an instruction-executing device to perform the method of claim 9.

* * * * *